United States Patent [19]
Gergen

[11] Patent Number: 5,995,847
[45] Date of Patent: *Nov. 30, 1999

[54] EMERGENCY ALERTING SYSTEM FOR REMOTELY LOCATED SITES

[75] Inventor: Paul N. Gergen, Pass Christian, Miss.

[73] Assignee: Lawrence Steelman, Gulfport, Miss.

[*] Notice: This patent is subject to a terminal disclaimer.

[21] Appl. No.: 08/699,480

[22] Filed: Aug. 19, 1996

Related U.S. Application Data

[63] Continuation-in-part of application No. 08/160,092, Nov. 30, 1993, Pat. No. 5,548,632.

[51] Int. Cl.⁶ ............................................. H04Q 7/20
[52] U.S. Cl. ............................................. 455/521; 455/404
[58] Field of Search ............................. 455/403, 404, 455/422, 521, 550, 38.1, 38.2; 235/379; 379/37–40, 45, 46; 902/1; 705/35, 43

[56] References Cited

U.S. PATENT DOCUMENTS

| | | | |
|---|---|---|---|
| 3,582,555 | 6/1971 | Kok | 179/179 |
| 4,176,254 | 11/1979 | Tuttle et al. . | |
| 4,380,201 | 4/1983 | Dion . | |
| 4,467,142 | 8/1984 | Rupp et al. | 179/5 |
| 4,763,349 | 8/1988 | Siegel et al. | 379/379 |
| 4,802,208 | 1/1989 | Yeh . | |
| 4,878,236 | 10/1989 | Ray et al. . | |
| 4,884,514 | 12/1989 | Shockey et al. . | |
| 4,911,087 | 3/1990 | Couvrette . | |
| 4,918,717 | 4/1990 | Bissonnette et al. | 379/40 |
| 5,054,058 | 10/1991 | Kakizawa . | |
| 5,086,463 | 2/1992 | Vesely et al. . | |
| 5,235,630 | 8/1993 | Moody et al. . | |
| 5,305,370 | 4/1994 | Kearns et al. | 379/45 |
| 5,354,974 | 10/1994 | Eisenberg | 235/379 |
| 5,517,547 | 5/1996 | Ladha et al. | 455/404 |
| 5,548,632 | 8/1996 | Walsh et al. | 455/521 |

*Primary Examiner*—Dwayne D. Bost
*Assistant Examiner*—William G. Trost
*Attorney, Agent, or Firm*—Garvey, Smith, Nehrbass & Doody, LLC

[57] ABSTRACT

A system for providing emergency alerting capability to persons at or near a remote banking terminal (ATM) or night-depository, in such a manner as to minimize risk to the possible victim and maximize the emergency response authorities' ability to monitor and respond to the situation. The device consists of a covert control and two-way communication unit attached to an Automatic Teller Machine or a night-depository. The unit is activated by a button or switch on the ATM, or by a remote radio receiver link from a keyed small radio transmitter. Upon activation, the unit dials a 911 emergency response office, establishing two-way voice communication from covert microphones at the ATM, and to a speaker hidden at the ATM. During communication, the unit is controlled by the emergency response operator. In an improved embodiment, the system would cover multiple automatic teller machines at an automatic teller machine site, so that when one of the automatic teller machines was activated by the user, there would be communication between that one automatic teller machine and a radio dispatcher at a 911 location, and the other automatic teller machines at the site would be deactivated.

12 Claims, 2 Drawing Sheets

EMERGENCY ALERTING SYSTEM FOR REMOTELY LOCATED SITES

This is a continuation-in-part application of prior, U.S. patent application Ser. No. 08/160,092, filed Nov. 30, 1993, U.S. Pat. No. 5,548,632.

SPECIFICATION

BACKGROUND OF THE INVENTION

1. Field Of The Invention

This invention relates to the field of emergency communication systems for making known the occurrence of an emergency requiring a response at a remote location.

2. General Background

The invention specifically relates to devices for making known the occurrence of robberies and/or assaults on users of Automatic Teller Machines (ATMs) or night-depository stations at banks, especially in conditions where only the assailants and the victim are present, and a safe and effective response is required.

The vulnerability of banking devices and people using them is long known. The current spread of ATMs, especially in remote and relatively unattended locations, has exasperated the problem of security for using ATMs and night-depositories. Such devices in these remote locations pose a danger, because they present the inviting opportunity of a remote location, a vulnerable individual, cash money and an easy chance of escape after perpetration of the crime. Alarm systems are generally ineffective, as each alarm must be responded to by a central alarm response firm which must first analyze the nature of the incident being alarmed before any assistance or help can be requested. Further, most alarms require a noticeable effort to activate, presenting the probability that the perpetrator will simply physically prevent the victim from activating the alarm or will take a violent action against the victim if the victim is seen to attempt an alarm.

The use of telephones for calling for help has proven quite satisfactory, as evidenced by the success of the 911 emergency response service nationally. However, installing pay phones at these isolated locations is not a practical solution for three major reasons. First, it is not economically feasible, as there is insufficient traffic to pay for the service. Next, persons using a pay phone are commonplace, not readily taken as a danger sign. A pay phone, thus, is an ideal waiting place for a perpetrator. Finally, a phone can easily be rendered inoperable by removing handset.

Any type of telephone, of course, requires a combination of actions to use, all of which are quite apparent to the perpetrator, and which an armed perpetrator can easily prevent or suppress. The placement of a regular telephone handset on an ATM or a night-depository is thus equally unsatisfactory. Any person planning a crime at the site will simply disable the telephone by forcibly removing or disabling the handset. It is further quite apparent again to a perpetrator whether a victim attempts to reach for a handset, and the perpetrator can usually physically prevent the victim from completing a call.

The wide-spread use of a standardized emergency response telephone system using a standardized number, "911", to switch through the existing telephone system into an emergency response network. Since such an emergency response network is required to respond to possible multiple simultaneous calls, it is a universal policy that no blind alarm may be used to directly dial into the 911 network. At all times, the 911 network requires the capability of controlling the duration and connection of a call so that the emergency response operator controls the line for every telephone call that is connected to the 911 network. As a result, alarm systems, in the sense of an automated alerting system, are prohibited from inter-connection to the 911 system by substantially all 911 jurisdictions.

SUMMARY OF THE PRESENT INVENTION

This invention discloses a system for providing emergency alerting capability to persons at or near a remote banking terminal (ATM) or night-depository, in such a manner as to minimize risk to the possible victim and maximize the emergency response authorities ability to monitor and respond to a known situation.

In summary, the device consists of a covert control and two-way communication unit attached to an Automatic Teller Machine or a night-depository, with two principle means of activation.

The first means of activation is a button or slap plate on the ATM which activates the emergency communications system. The second means of activation is a remote radio receiver link, which works in conjunction with a keyed small radio transmitter. These remote transmitters can be issued to customers who use the night-depository. This can also include persons engaged in ATM maintenance who are vulnerable to attack because they are known to be capable of opening the ATM, giving access to the cash bank therein.

Upon activation, the device searches for, within an attached telephone line or plurality of telephone lines, an available line identifying an available line by standard telephone signaling tone. The device then repeatedly accesses an emergency response number, usually 911, until a voice grade connection can be established with the emergency response center. The device then activates two-way communication between the emergency response center and the ATM or night-depository. Included in this are covert, relatively long-range microphones covering the entire vicinity of the ATM and night depository for the pick-up of sound and voice, as well as a speaker system permitting the emergency response operator to communicate with all persons in the vicinity of the ATM and night depository.

The device further remains responsive to and controllable by the emergency response operator during the period of voice interconnection and specifically, the device responds to control codes/tones which are used by the emergency response operator to control the 911 system to permit the emergency response operator to continue the connection or to terminate the connection after analysis of the circumstances as revealed by the sound being picked up in the vicinity of the ATM or night-depository and any response to verbal communication from the emergency response operator. This latter feature is essential for obtaining approval to interconnect the device with the emergency response system.

In addition to the features and objects of the original system, it is a principal object of the improved system to increase the readiness of the SafeAlert system so that if a phone line or electric power failure happens, the telephone or electric company is notified for maintenance.

It is a further principal object of the improved system to proved a network which would allow the expansion of the SafeAlert system to cover up to three ATM's at a single branch.

In an additional embodiment of the system of the present invention, there is included the audio bridge network which is an expansion of the system to cover up to at least three ATMs at one branch. The audio bridge network would convert one safe alert system into two additional telephones for turns on the appropriate microphone and speaker combination with a push of the 911 button for that particular ATM. Further, the improvements include a feature of monitoring reporting which includes a security management which is able in "real time" review and dispatch the appropriate repair and security personnel for an ATM. This may include the electric company, phone company, and branch security management.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
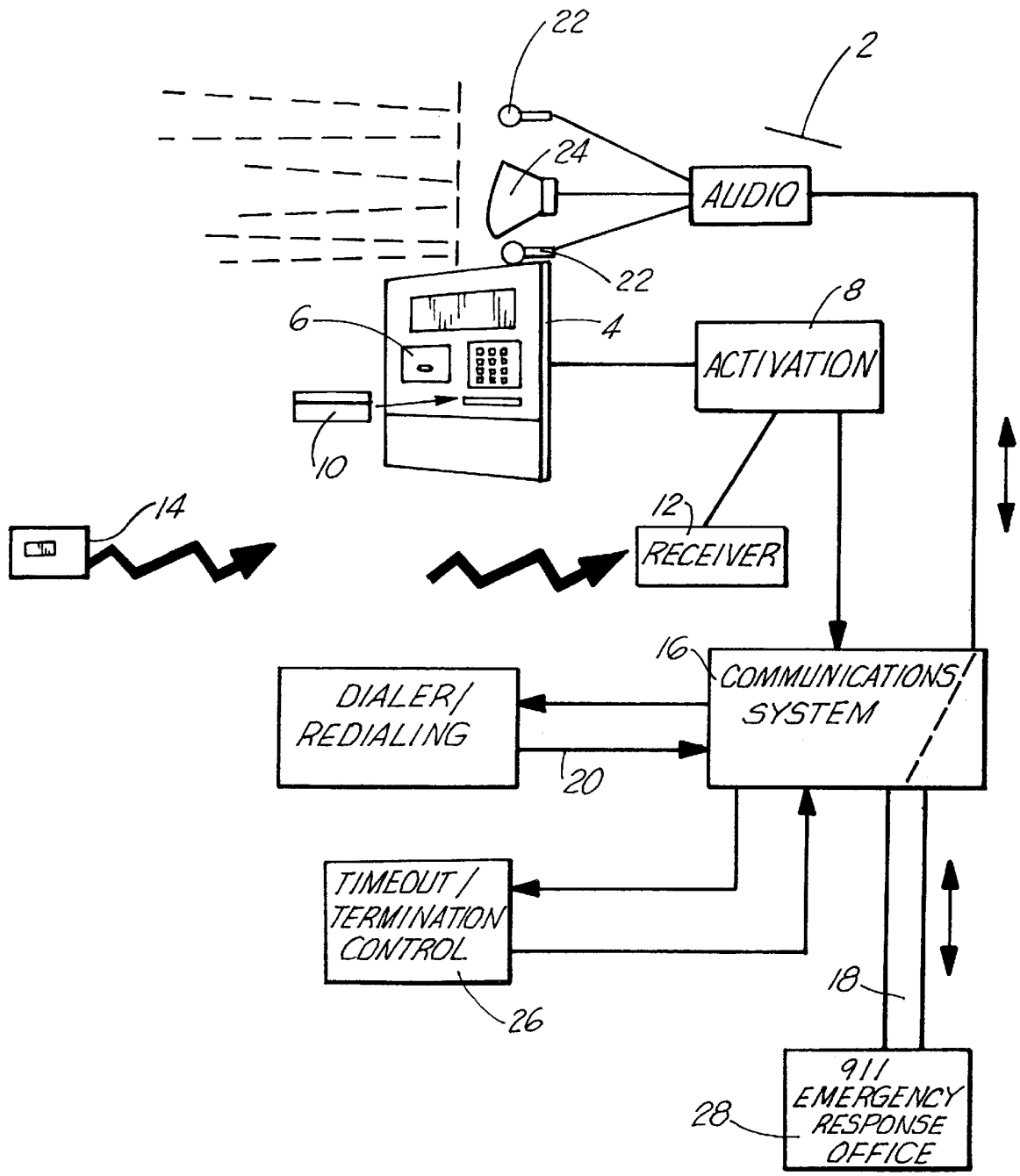
FIGS. 1 and 2 represent block diagrams of the present invention.

The invention comprises an emergency communication system for installation on an Automatic Teller Machine (ATM) or in the vicinity of a night depository box which provides for a significant and largely covert communications function enabling a victim to call for medical assistance or report a crime as a result of a criminal confrontation at an ATM or night depository. While the description below concentrates on installation on an ATM, which is considered the most vulnerable location for assaults upon lone users, it should be apparent to those of skill in the art how the invention is equally installable in the vicinity of night depositories and bank lobbies or windows, and similar remote sites. It is not considered that the invention is intended for locations which enjoy extensive traffic, in as much as the constant presence of numbers of people tends to prevent the type of surruptous approach in robbery which occurs at lone ATMs. Additionally, the risk of false activation is considered unduly high in such locations.

The invention consists of a concealed control unit 2 located in a manner so that it is not accessible readily to the public. This can be accomplished by placing the primary box containing the unit behind an ATM 4 or in some other location closely physically approximating the ATM, but concealed from view and access. At the ATM is provided a manually activated alert means 6. This may consist of a push button or a slap plate. It is preferred that the ATM 4 have a large warning sign that police notification is available from the sight, as a deterrence against perpetrators lurking in the vicinity of the site. However, no other visual or audial indication of activation of the alert system should be at the location so as to minimize perpetrator reaction to an actual activation. The on-site means for alerting 6 is preferably a push button which may either a thumb activated button, or preferably, a larger button which may be activated by pressing with the palm, and which can be preferably surreptously pressed as though the individual is leaning against the ATM. Within the alert means there is a first activator circuit 8 which provides three separate forms of activation.

The first form of activation is by depressing the button 6 provided on the ATM. As an option, this activation circuit may be interconnected to the ATM so that it is only activated on a combination of an ATM card being inserted 10 in the ATM, indicating a legitimate customer or possible victim, and depressing of the button. This is considered desirable in some locations to prevent false activation by vandals or passers by.

A second activation circuit 12 is provided as a UHF radio receiver, responding to tone codes to identify a specific transmitter 14.

Such receivers 12 and transmitters 14 are known in the art for other signaling and control purposes. In this invention, the transmitter 14 is provided as a small hand-held push button short range transmitter 14, such as may be provided on a wristband as though it were a wristwatch, or as a key ring attachment, of as a pendant. Each transmitter 14 is identified by a particular digital code held in a non-volatile memory form, the code being transmitted as digital modulation on the radio signal and received by the activator circuit. The activator consists of a receiver decoding the digital transmission and comparing it with a series of authorized digital transmitters which are also in non-volatile memory within the radio activator circuit 12. Upon detection of a match of a digital code being received with a digital code in memory, indicating an authorized user of the ATM, the activator circuit 8 triggers an activation. This coding serves to authenticate the transmitter as associated with a specific ATM, preventing false alarm by the wrong ATM.

Upon an activator circuit 8 triggering a valid activation, a communications system 16 activates and performs the following tasks in sequence:

First, unless the unit is connected to a dedicated telephone line, the unit 16 searches the telephone lines 18 t is connected to for an open line by detecting the presence of a dial tone.

Upon detecting a dial tone, the unit 16 goes off-hook and begins a pre-programmed dialing sequence into the connected 911 telephone system. The 911 telephone system is a specific telephone interconnect provided by local telephone companies and is well understood. Access to and the handling of such a call is described in, for instance, U.S. Pat. No. 5,249,223 to Vanacore which discloses the sequence of processing of the 911 call once dialed into a local central office. The ATM 4 will, of course, have been previously registered with the 911 system so as to provide identification of the location in the coding of the 911 call. Suitable techniques for such coding and interconnection are disclosed in, for instance, U.S. Pat. No. 5,235,630 to Moody et al.

The connection unit 16 then monitors the line 18. If no sound is detected on the phone line for ten or twelve seconds after dialing without receiving a ring-back tone, a one and a half to two second tone, the alert system goes on-hook, re-accesses the telephone line 18 and repeats the dialing sequence 20.

The same sequence 20 is followed if a busy tone, a repetitive five or six times tone within the first ten or twelve seconds after dialing, is received.

The re-dialing sequence 20 is also done if a steady tone of three seconds duration immediately follows the dialing of the number, indicating a failure of the local central office to 911 system to fully connect as may be called by a hang-up on an incoming call or the rejection of dialing information by the phone company.

Upon detection of the ring-back tone, a tone of one to two seconds duration followed by a silence of an equal or greater duration, and indicating the ringing of the 911 phone, the redial circuits 20 are locked out.

Upon answering and connection of the service, the alert unit 2 performs two tasks. First, it immediately connects covertly located microphones 22 to the telephone line. The microphones 22 are placed in the ATM to cover an area within a fifteen foot radius of the ATM, transmitting 300 to 5000 hertz, the typical voice tones. It 2 also connects the telephone line to a covertly location speaker 24 at the ATM. The speaker 24 has a volume loud enough to be heard within the same fifteen foot radius of the ATM. Both the speaker 24 and the microphones 22 are immediately connected for audio transmission to and from the 911 system through the local telephone lines 18. At the same time, the communications system 16 is armed to respond to the presence of a dial tone, a steady tone, or a termination tone, indicating termination of the circuit by the 911 emergency response operator 28, and, at this point, will release the line and reset for a subsequent activation and recall.

The unit may also be equipped with a time-out circuit 26 to time-out and release the 911 line after a fixed time of connection as may be required by the local emergency response authorities.

It is considered critical for the invention, that the alerting device 2 interconnects with the emergency response operator 28 for two-way communication, permitting the emergency response operator 28 to monitor the voice conversations occurring within a fifteen foot radius of the ATM, and, at the same time, if deemed appropriate, to address the persons in the vicinity of the ATM or night depository to induce a response. It is equally important the 911 operator 28 maintains final control over the connection to the response line from the time of activation, and that the alert device 2 respond to any forced disconnect by the 911 emergency operator 28 response. It is the presence of these characteristics, which are not present in a blind alarm system, which permit the alert system to directly connect to a 911 emergency response office.

All 911 emergency response centers known to the inventor, refuse to permit direct interconnection of an alarm signal alert to 911, because the prevalence of false alarms, and the inability of the 911 emergency response operator to control ultimately access to and duration of connection the 911 system. It is the invention's providing of two-way voice communication immediately upon a signaling of an alert, together with the devices response to and termination control by the 911 emergency response office that makes the device acceptable as a direct access alerting system to the 911 system.

In the event of radio alert activation which may occur for a unit installed in an ATM or a unit installed in night depository box, additional covert microphones 22 are provided to provide for a more distant voice pick-up. This is in consideration of the fact that the remote alarm is designed specifically for use by specific customers who habitually deposit or carry large amounts of cash to or from an ATM or a night depository. It is considered appropriate to provide such persons with a method of signaling an alert upon approach to a night depository or ATM if it appears that an unsafe or dangerous condition exists. Since this is likely to occur at a distance outside the normal fifteen foot voice radius of the manually activated system, it is important to provide directional microphones providing for longer range voice monitoring. Such microphones can be provided and typically will provide for a 35 to 40 foot voice range, which may be aimed towards a known location. The trusted depositors, equipped with the individual alerting device, will, of course, be briefed on the location to be for proper voice monitoring.

It is considered important that the invention provide no visible indication of its activation, as this is considered to reduce the possibility that the perpetrator will take violent action against the victim. All 911 emergency response offices record all conversations and transmissions made into them. This provides a proper evidentiary record of all verbal communications occurring after activation of the alert system and provides important evidence for the apprehension and conviction of any perpetrator. This recorded evidence is considered to be a significant advantage of the system, in as much as the 911 emergency response office recordings will typically be fully admissible evidence in court, whereas a mechanical tape recorder connected to a remote alarm system would meet no such evidentiary standards. The knowledge that events occurring within the vicinity of any ATM equipped with the invention permit direct identification and conviction of the perpetrator would have a long term deterrent effect against crimes being perpetrated against users of ATMs and night depository boxes equipped with the invention.

It can readily be seen how the invention permits easy and covert activation of an alerting system for emergency response by the possible victim of an attack in the vicinity of a remote ATM or night depository box without inducing violent reaction against the victim as would be induced by a visual or an audible alarm going off. Further, the two-way communication provided by the invention to a manned response point significantly reduces the possibility of false alarms and increases the probability of detection and apprehension of persons who attempt falsely to alarm the unit. In addition, the option in which a card must be inserted before a manual alarm can be sounded further reduces the possibility of false alarms. Finally, the invention, providing total control over the alerting and recording process on the part of the 911 emergency response office, both satisfies all requirements for connection directly to 911 emergency response office and, at the same time, provides for an evidentiary record which significantly increases the chances of apprehension and conviction of any perpetrator of the crime against the user of such a device.

Further, since all aspects of the alarm are covert, and add no additional equipment to the ATM, the possibility of vandals disabling the alerting system is significantly reduced or eliminated. This is particularly true in comparison with the practice of putting a two-way telephone handset at such a unit; such handsets are almost invariably pulled off or destroyed, and any perpetrator would sabotage such a unit before lying in wait for his victims.

Figure 2:
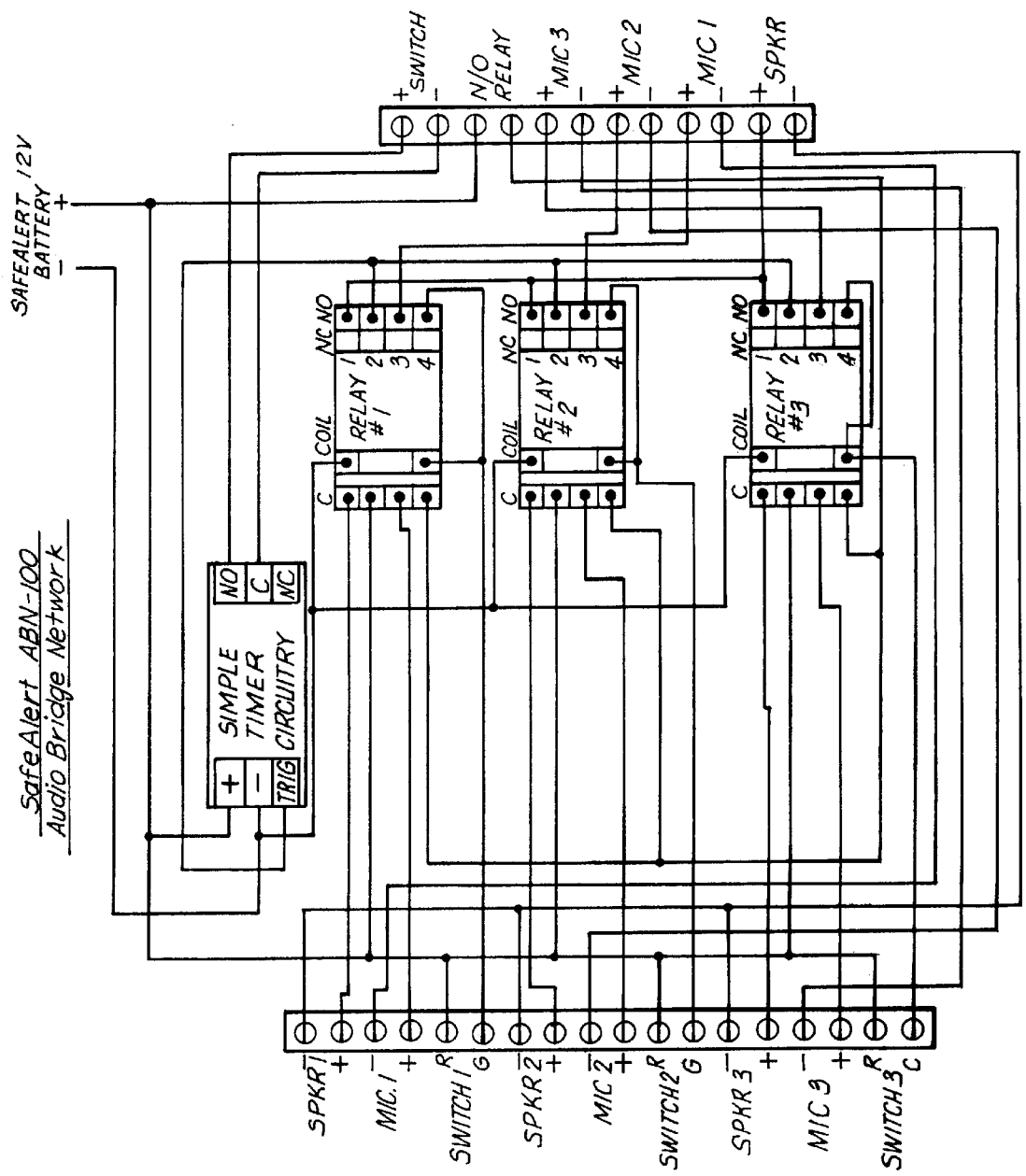

An improved embodiment of the present invention is seen in the block diagram as FIG. 2, and is referred to in part as the Audio Bridge Network. This network would allow the expansion of the SafeAlert system to cover up to three ATM's at a single branch. This expansion can take place when the ATM's are in close proximity to one another. This is an Audio Bridge which converts one SafeAlert into two additional telephones for turns on the appropriate microphone and speaker combination with the push of the 911 button for that particular ATM. Only the speaker and microphone on the ATM where the 911 button is pushed becomes operative. This is done to decrease background notice and increase effectiveness. This is significant when conversation of telephone lines is a concern.

Furthermore, the improved embodiment would include a system of monitoring reporting in the system. Under the improved system, Security Management can in "real time" review and dispatch the appropriate repair and security personnel for an ATM. This could include: electric company, phone company, and branch security management. This would provide up to three SafeAlert status reports for a particular branch through the existing alarm system and alarm station. These are: activation—ac power—phone line failure. via three separate zones on an existing alarm system.

Any bank with a central station alarm facility can utilize a standard data base format to ensure that each zone brings up the appropriate point of contact for faults or usage at that branch. This is critical to the readiness of the SafeAlert system as a phone line or electric power failure happens, the telephone or electric company is notified for maintenance. It can thus be seen that the invention provides for a unique and far more effective alerting system for the assistance to users of remotely located ATMs, night depository boxes and similar locations which are particularly susceptible to assaults on victims known to be carrying money.

The following table lists the part numbers and part descriptions as used herein and in the drawings attached hereto.

PARTS LIST

| Desription | Part No. |
|---|---|
| concealed control unit | 2 |
| ATM | 4 |
| manually activated alert means | 6 |
| activator circuit | 8 |
| ATM card | 10 |
| second activation circuit | 12 |
| transmitters | 14 |
| unit | 16 |
| telephone lines | 18 |
| redial circuits | 20 |
| microphones | 22 |
| speaker | 24 |
| emergency response operator | 28 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An emergency alert system for use with multiple automatic teller machines located at an automatic teller machine location when one of the machines is approached by an authorized user to obtain banking services from the teller machine, the system comprising:
   a) activation means operated by the user for establishing both operation of the automatic teller machine being used for banking services and a two way communication between the user at the automatic teller machine in use and an emergency dispatcher, wherein said two way communication is a direct interconnection of an alarm signal alert to a selected emergency "911" number;
   b) said communication originating from a microphone positioned at the automatic teller machine being used to pick up sounds from the vicinity of the automatic teller machine location;
   c) said communication being a speaker located at the automatic teller machine being used to receive sound communication from the emergency dispatcher to the vicinity of the automatic teller machine location; and
   d) termination means for allowing only the emergency dispatcher to terminate said two way communication.

2. The system of claim 1, further comprising an audio bridge which converts one automatic teller machine into two additional telephones that turns on the appropriate microphone and speaker combination with the push of the 911 button for that particular automatic teller machine being used.

3. The system of claim 1, said means for establishing the two-way communication includes a manually activated switch located at said automatic teller machine location.

4. The system of claim 1, wherein said means for establishing the two-way communication includes a coded radio transmission generated from an individual radio transmitter carried by the user and transmitted to a receiver concealed in said automatic teller machine.

5. An emergency response communications system for use at an automatic teller machine location having at least three automatic teller machines, the system comprising:
   a) at least one microphone receiving sound signals from each of the automatic teller machines at the automatic teller machine site;
   b) at least one speaker communicating voice signals to each of the automatic teller machines at the automatic teller machine sites;
   c) activation means for establishing both operation of at least one automatic teller machine for banking services and a two way sound communication between the one automatic teller machine and an emergency dispatcher in response to a telephone call from that automatic teller machine, wherein said two way communication is a direct interconnection of an alarm signal alert to a selected emergency "911" number, from the automatic teller machine being used; and
   d) termination means for allowing only the emergency dispatcher to terminate said communication between the dispatcher and the one automatic teller machine being used in communication with the dispatcher.

6. The system of claim 5 wherein said activation means for establishing communication includes:
   a) means for connecting to a telephone line;
   b) means responsive to a dial tone on said telephone line, for dialing an emergency dispatcher; and
   c) means responsive to an interconnect with an emergency dispatcher, for controlling said sound communications, terminating said communications upon detection of a tone code from said emergency dispatcher directing said termination.

7. The system in claim 5, wherein said means for dialing comprises dialing 911.

8. The system in claim 5 wherein said activating signal comprises a manually activated switch, activated at the automatic teller machine site.

9. The system in claim 5 wherein said activating signal comprises a coded radio signal from an individual radio transmitter located at the automatic teller machine site.

10. The system in claim 9 wherein said radio transmitter comprises a small, hand held transmitter transmitting a digital code corresponding to an authentication of said transmitter.

11. The system in claim 5 wherein said means for dialing further comprises:
   a) means, responsive to the presence of tones on said telephone line, for detecting failure to connect to said emergency dispatcher;
   b) means, responsive to the detection of said failure, for re-dialing said emergency dispatcher; and
   c) said means for redialing continuously redials until connection to said emergency dispatcher is established.

12. The system of claim 5 further comprising means, responsive to the establishment of voice communications from said emergency dispatcher, which prevents further re-dialing.

* * * * *